US009595768B2

(12) United States Patent
Lyon et al.

(10) Patent No.: US 9,595,768 B2
(45) Date of Patent: Mar. 14, 2017

(54) GLAZING WITH A SOLDERED CONNECTOR

(75) Inventors: Michael Lyon, Bickerstaffe (GB); Naotaka Ikawa, Osaka (JP); Kazuo Inada, Osaka (JP); Mamoru Yoshida, Tokyo (JP); Takashi Muromachi, Tokyo (JP); Kazuhisa Ono, Tokyo (JP); Kozo Okamoto, Osaka (JP); Takashi Suzuki, Osaka (JP)

(73) Assignees: Pilkington Group Limited, Lathom (GB); Nippon Sheet Glass Co. Ltd., Tokyo (JP); Nishinihon Shoko Co., Ltd., Osaka (JP)

( * ) Notice: Subject to any disclaimer, the term of this patent is extended or adjusted under 35 U.S.C. 154(b) by 56 days.

(21) Appl. No.: 13/261,769

(22) PCT Filed: May 2, 2012

(86) PCT No.: PCT/GB2012/050958
§ 371 (c)(1),
(2), (4) Date: Jan. 13, 2014

(87) PCT Pub. No.: WO2012/150452
PCT Pub. Date: Nov. 8, 2012

(65) Prior Publication Data
US 2014/0138155 A1   May 22, 2014

(30) Foreign Application Priority Data

May 3, 2011   (GB) .................................... 1107311.1
Jul. 5, 2011   (GB) .................................... 1111481.6

(51) Int. Cl.
| | | |
|---|---|---|
| B23K 31/02 | (2006.01) |
| H01R 4/02 | (2006.01) |
| B23K 35/26 | (2006.01) |
| B32B 17/10 | (2006.01) |
| C03C 27/04 | (2006.01) |
| B23K 35/00 | (2006.01) |
| B32B 15/01 | (2006.01) |
| C22C 13/00 | (2006.01) |
| C22C 28/00 | (2006.01) |

(52) U.S. Cl.
CPC ........... *H01R 4/023* (2013.01); *B23K 35/001* (2013.01); *B23K 35/26* (2013.01); *B23K 35/262* (2013.01); *B32B 15/01* (2013.01); *B32B 17/10174* (2013.01); *C03C 27/046* (2013.01); *C22C 13/00* (2013.01); *C22C 28/00* (2013.01)

(58) Field of Classification Search
None
See application file for complete search history.

(56) References Cited

U.S. PATENT DOCUMENTS

| | | | | | |
|---|---|---|---|---|---|
| 3,553,833 | A | * | 1/1971 | Jochim et al. | 29/611 |
| 3,627,517 | A | * | 12/1971 | Ibscher | C22C 13/00 |
| | | | | | 420/555 |
| 3,671,311 | A | * | 6/1972 | Tarnopol et al. | 65/43 |
| 3,703,445 | A | * | 11/1972 | Tarnopol et al. | 205/120 |
| 3,721,594 | A | * | 3/1973 | Tarnopol et al. | 156/89.17 |
| 3,721,595 | A | * | 3/1973 | Tarnopol et al. | 156/89.17 |
| 4,362,903 | A | * | 12/1982 | Eichelberger et al. | 174/94 R |
| 5,271,994 | A | * | 12/1993 | Termath | 428/216 |
| 5,299,726 | A | * | 4/1994 | Sauer | 228/111.5 |
| 5,368,661 | A | * | 11/1994 | Nakamura et al. | 148/512 |
| 5,863,493 | A | | 1/1999 | Achari et al. | |
| 6,197,434 | B1 | * | 3/2001 | Hsu | 428/615 |
| 6,241,942 | B1 | | 6/2001 | Murata et al. | |
| 6,253,988 | B1 | * | 7/2001 | Pereira | 228/122.1 |
| 6,367,683 | B1 | * | 4/2002 | Rass et al. | 228/121 |
| 6,488,888 | B2 | | 12/2002 | Murata et al. | |
| 6,841,845 | B2 | | 1/2005 | Iwamoto et al. | |
| 7,132,746 | B2 | | 11/2006 | Brandenburg et al. | |
| 7,142,088 | B2 | | 11/2006 | Tanaka | |
| 7,159,756 | B2 | | 1/2007 | Winter et al. | |
| 7,268,415 | B2 | | 9/2007 | Abbott et al. | |

(Continued)

FOREIGN PATENT DOCUMENTS

| | | | |
|---|---|---|---|
| EP | 0 847 829 A1 | 6/1998 | |
| EP | 1207539 A1 * | 5/2002 | ............. H01F 27/29 |
| EP | 2 177 305 A1 | 4/2010 | |
| EP | 2 275 224 A1 | 1/2011 | |
| EP | 2 365 730 A1 | 9/2011 | |
| EP | 2 367 399 A1 | 9/2011 | |
| JP | 61035317 A * | 2/1986 | |

(Continued)

OTHER PUBLICATIONS

"Indium/Copper Intermetallics", Application Note; Indium Corporation of America.
P. Sebo et al; "Effect of indium on the microstructure of the interface between Sn3.13Ag0.74CuIn solder and Cu substrate"; Journal of Alloys and Compounds; Jul. 2009; pp. 409-415; vol. 480, No. 2.

*Primary Examiner* — Kiley Stoner
(74) *Attorney, Agent, or Firm* — Marshall & Melhorn, LLC

(57) ABSTRACT

A glazing is disclosed comprising at least one ply of glass having an electrically conductive component on at least one surface, and an electrical connector electrically connected to the electrically conductive component through a soldered joint, the solder of the joint having a composition comprising 0.5 wt % or more indium, wherein the electrical connector comprises a nickel plated contact for contacting the solder. Also disclosed are solders having a composition comprising 14 to 75 wt % In, 14 to 75 wt % Sn, to 5 wt % Ag, to 5 wt % Ni, and less than 0.1 wt % Pb. Also disclosed is use of a solder having a composition comprising 0.5 wt % or more indium to solder a nickel plated electrical connector to an electrically conductive component on the surface of a ply of glass. The aspects of the invention improve the durability of electrical connections on glazing.

14 Claims, No Drawings

(56) References Cited

U.S. PATENT DOCUMENTS

| | | |
|---|---|---|
| 7,368,328 B2 | 5/2008 | Abbott et al. |
| 7,588,819 B2 | 9/2009 | Saimi |
| 7,617,964 B2 | 11/2009 | Winter et al. |
| 7,909,665 B2 | 3/2011 | Lyon |
| 2003/0007885 A1* | 1/2003 | Domi et al. ............... 420/557 |
| 2003/0015575 A1 | 1/2003 | Yamaguchi et al. |
| 2003/0091093 A1* | 5/2003 | Zitzmann et al. ........... 374/185 |
| 2003/0180545 A1* | 9/2003 | Capriotti et al. ............ 428/432 |
| 2006/0126196 A1* | 6/2006 | Crumbach et al. .......... 359/883 |
| 2006/0240265 A1* | 10/2006 | Cook et al. ................. 428/426 |
| 2007/0152019 A1* | 7/2007 | Winter et al. ............... 228/101 |
| 2007/0224400 A1* | 9/2007 | Meguro et al. .............. 428/209 |
| 2007/0224842 A1 | 9/2007 | Hoepfner et al. |
| 2009/0170380 A1* | 7/2009 | Lyon ............................ 439/874 |
| 2009/0233119 A1* | 9/2009 | Lyon ............................ 428/598 |
| 2010/0084050 A1 | 4/2010 | Kraemer |
| 2010/0276473 A1* | 11/2010 | Hagen et al. ................ 228/121 |
| 2010/0307823 A1 | 12/2010 | Kawamata et al. |
| 2010/0327431 A1* | 12/2010 | Touzelbaev et al. ......... 257/712 |
| 2011/0120769 A1* | 5/2011 | Sakatani ............... B23K 35/262 |
| | | 174/84 R |
| 2011/0204121 A1 | 8/2011 | Kawamata et al. |
| 2012/0012642 A1* | 1/2012 | Fogel et al. ................. 228/56.3 |
| 2012/0222893 A1* | 9/2012 | Hwang et al. ............... 174/257 |
| 2012/0298416 A1* | 11/2012 | Ziegler et al. .............. 174/75 R |
| 2012/0318566 A1 | 12/2012 | Reul et al. |
| 2014/0271343 A1* | 9/2014 | Hwang et al. ............... 420/555 |
| 2016/0133595 A1* | 5/2016 | Uemura ................. H01L 24/17 |
| | | 257/737 |

FOREIGN PATENT DOCUMENTS

| | | |
|---|---|---|
| JP | 01039528 A * | 2/1989 |
| JP | 03-209793 A | 9/1991 |
| JP | 2002001520 A | 1/2002 |
| JP | 2003521093 A | 7/2003 |
| JP | 2003-332731 A | 11/2003 |
| JP | 2005-154797 A | 6/2005 |
| JP | 2010505625 A | 2/2010 |
| JP | 2011005542 A | 1/2011 |
| SU | 637217 A1 | 12/1978 |
| WO | WO 01/56334 A | 8/2001 |
| WO | 2004/068643 A1 | 8/2004 |
| WO | 2007/021326 A2 | 2/2007 |
| WO | 2007/110612 A1 | 10/2007 |
| WO | WO 2010122764 A | 10/2010 |
| WO | WO 2014170613 A1 * | 10/2014 |

\* cited by examiner

GLAZING WITH A SOLDERED CONNECTOR

BACKGROUND OF THE INVENTION

The present invention relates to glazings and more particularly glazings comprising soldered electrical connections between electrically conductive components on surfaces of the glazings and electrical connectors. The invention also relates to electrical connectors for use in such glazings and to solders to solder connectors to electrically conductive components on the surface of glazings.

Glazings, especially vehicle glazings, may have electrically conductive components, such as circuits printed on the surface of a ply of glass or an array of wires fixed within a laminated glazing, in electrical connection to the wiring harness of a building or, more usually, a vehicle. Such circuits find use as heating circuits, to promote de-misting or de-icing, or as antenna circuits. Generally, electrical connection is made by a connector being soldered to an electrically conductive substrate known as a bus bar, which may be provided directly on the surface of a piece of glass, or fully or partly on a fired, printed band on the glass, known as an obscuration band. The bus bar is typically printed using a silver-containing ink. Historically, the solder used to join the bus bar and the connector contained lead. However, lead is known to be harmful, and there is increasing legislative pressure to use lead-free solders in industry.

Lead-free solders have been disclosed in, for example, WO-A-2004/068643 which relates to tin-based solders (up to 90% by weight tin) comprising a mechanical stress modifier selected from bismuth, indium or antimony. The solder may also contain silver and/or copper.

EP-2 177 305 discloses a lead-free solder alloy which can be used for soldering vehicle mounted electronic circuits, the alloy consists essentially of silver, indium (at 3 to 5.5 mass %), copper, optionally bismuth with the balance being tin.

WO-A-2007/110612 discloses some improved electrical connectors for use with glazings. The structure of the connector is chosen to maximise the adhesion between the electrically conductive components in the glazing and is especially for use with lead-free solders.

WO-A-2007/021326 discloses a solder composition having a mixture of elements including tin, indium, silver and bismuth and which includes between 30 to 85% tin and about 15 to 65% indium.

Unfortunately a number of lead-free solders can introduce problems when used, in particular, in vehicle glazings because such solders are not generally intended for use on glazings and so are not tested by accelerated aging for extended periods nor by extensive chemical testing using aggressive chemicals. More particularly, accelerated durability testing by the Applicants of indium containing solders used on glazings has identified deterioration in performance especially at high temperatures or in humidity exposure tests and thermal cycling tests. The consequence of this deterioration is a reduction in bond strength between the solder and either the electrical connector or the electrically conductive circuit printed on the surface of a ply of glass. Although it is not yet clear what the mechanism is of such deterioration in bond strength, analysis has suggested that the formation of an intermetallic layer at the interface between the solder and the connector (especially when the connector is copper-containing) and also at the interface between the solder and the electrically conductive circuit (especially when the circuit is printed using a silver-containing ink) may be responsible. Cracks seem to form at these interfaces after thermal and/or humidity cycling.

The intermetallic layer at the interface between the solder and the connector is thought (at present) to result from a reaction between components of the solder (e.g. indium) and components of the connector (e.g. copper). The formation of intermetallic layers has been also suggested in Application Notes from the Indium Corporation of America (e.g. *Indium/Copper Intermetallics*).

SUMMARY OF THE INVENTION

It is an aim of the present invention to address the problems of the prior art and to provide a solution.

DETAILED DESCRIPTION OF THE INVENTION

The present invention accordingly provides in a first aspect a glazing comprising at least one ply of glass having an electrically conductive component on at least one surface, and an electrical connector electrically connected to the electrically conductive component through a soldered joint, the solder of the joint having a composition comprising 0.5 wt % or more indium, wherein the electrical connector comprises a metal- (preferably nickel) plated contact for contacting the solder.

Surprisingly, a nickel plated contact appears to reduce the deterioration in bond strength upon thermal cycling, elevated temperature storage or humidity cycling. This is greatly advantageous because of the very extensive testing that electrical connections on vehicle glazings have to undergo to be accepted by vehicle manufacturers as well as the very high durability required in practice.

Preferably, the solder has a composition comprising 0.01 wt % or more Ni, preferably 0.01 wt % to 5 wt % Ni, more preferably 0.05 wt % to 5 wt % Ni. This is greatly advantageous because Ni containing solder appears to further improve durability of the joint. It is not clear how this occurs, but it is, at present, thought by the applicants that the presence of Ni in the solder has the effect of blocking any pores in the Ni plating of the connector which, in particular after long term testing, improves durability of the joint still further by reducing formulation of a connector-solder intermetallic layer through any pores in the Ni plating.

It is preferred if the solder comprises 0.06 wt % to 5 wt % Ni or 0.05 to 2 wt % nickel, preferably 0.05 to 1 wt % nickel, more preferably 0.05 to 0.5 wt % nickel and most preferably 0.08 to 0.2 wt % nickel.

Preferably, the solder comprises 0.1 to 2 wt % copper, more preferably 0.1 wt % to 1 wt % copper. More preferred ranges of copper within the solder comprise 0.2 wt % to 0.9 wt % and especially 0.2 wt % to 0.8 wt % copper.

Surprisingly, the presence of copper within the solder is thought to result in improved bond strength especially after thermal cycling or humidity/thermal testing. This is despite the fact that the presence of copper within the solder would be (prior to this invention) thought to lead to an increase in the formation of an intermetallic layer thereby increasing such problems.

It is preferred that the solder has a composition comprising less than 0.1 wt % Pb (i.e. is "Pb-free"). It is preferred that there is no deliberate addition of Pb to the solder.

Solders according the invention may comprise 0.1 to 5 wt % silver, preferably 0.1 wt % or 0.5 wt % or more silver, more preferably 0.5 wt % to 2 wt % silver and most preferably 0.8 to 1.2 wt % silver.

Preferably, the solder has a composition comprising:
5 to 75 wt % In,
5 to 94 wt % Sn, and
0.1 to 5 wt % Ag.

It is preferred that the solder comprises 20 to 75 wt % indium, more preferably 40 to 75 wt % indium and most preferably 60 to 75 wt % indium.

It is preferred that the solder comprises 20 to 60 wt % tin, more preferably 20 to 40 wt % tin, 20 to 35 wt % tin, 25 to 35 wt % tin and most preferably 27 to 32 wt % tin.

Surprisingly, it has been discovered that the presence of nickel in the solder may be advantageous in relation to the thermal cycling/reduction in bond strength problem.

Consequently, in a second aspect, the present invention provides a solder having a composition comprising:
14 to 75 wt % In,
14 to 75 wt % Sn,
0.1 to 5 wt % Ag,
0.01 to 5 wt % Ni, and
less than 0.1 wt % Pb.

In relation to the second aspect it is preferred that the solder comprises 20 to 75 wt % of indium, more preferably 40 to 75 wt % indium and most preferably 60 to 75 wt % indium.

It is preferred that in the solder according to the second aspect, the solder comprises 20 to 60 wt % tin, more preferably 20 to 40 wt % tin, 20 to 35 wt % tin, 25 to 35 wt % tin and most preferably 27 to 32 wt % tin.

It is also preferred that the solder according to the second aspect of the invention comprises 0.06 wt % to 5 wt % Ni or 0.05 to 2 wt % nickel, preferably 0.05 to 1 wt % nickel, more preferably 0.05 to 0.5 wt % nickel and most preferably 0.08 to 0.2 wt % nickel.

Solders according to the second aspect of the invention preferably comprise 0.2 to 2 wt % silver, more preferably 0.5 to 1.5 wt % silver and most preferably 0.8 to 1.2 wt % silver.

The solders according to the second aspect of the invention find use in providing electrical connection between connectors and electrically conductive circuits, especially circuits printed on the surface of a ply of glass.

Thus, preferably, in a third aspect the present invention provides use of a solder as claimed in any one of the preceding claims to solder an electrical connector to an electrically conductive component on the surface of a ply of glass.

In a fourth aspect the present invention provides a (preferably a vehicle glazing) glazing comprising, at least one ply of glass having an electrically conductive component on at least one surface, an electrical connector soldered to the electrically conductive component, characterised in that the solder has a composition comprising:
14 to 75 wt % In,
14 to 75 wt % Sn,
0.1 to 5 wt % Ag, and
0.01 to 5 wt % Ni.

Preferred features of the solder of the second aspect of the invention apply also to solders to be used in the glazings of the fourth aspect.

In glazings according to the present invention, it is preferred if the electrically conductive component comprises electrically conductive silver-containing ink. The conductive component will usually be a component which is printed using such silver containing ink onto the surface of at least one ply of glass.

In a fifth aspect, the present invention provides an electrical connector for electrical connection to an electrically conductive component on the surface of a ply of glass through a soldered joint, the solder of the joint having a composition comprising 0.5 wt % or more indium, and wherein the electrical connector comprises a nickel plated contact for contacting the solder.

In a sixth aspect, the present invention provides use of a solder having a composition comprising 0.5 wt % or more indium to solder a nickel plated electrical connector to an electrically conductive component on the surface of a ply of glass.

The present invention is illustrated by the examples.

EXAMPLE 1

In Example 1 solders according to the compositions described in Table 1 were used to connect a busbar (silver frit) on the surface of a vehicle glazing glass ply with a copper-based connector having a bracket shape. The connector was either Ni plated or Sn plated. Solders 2 to 4 are copper is containing solders. Solder 1 is a nickel containing solder.

The soldered joints to connectors were subjected to accelerated aging tests as follows:

Terminal bending (initial pull) in the X, Y and Z directions (where Z refers to the direction perpendicular to the glass surface);

High temperature and humidity testing at 85° C., 95% relative humidity for 100 hours;

Salt water spray (3 cycles);

Other chemical testing by immersion of the joint in the test chemical (liquid) for 2 hours. Test chemicals were: 0.1 N sulphuric acid, 0.1 N sodium hydroxide, gasoline, gas oil/diesel fuel, kerosene, engine coolant, and window washer liquid.

After testing the strength of the joint was determined by a controlled speed pull perpendicular to glass surface (except X and Y bend tests). Peak force was measured. The results are described in Table 2, Table 3 and Table 4 with strength reported in N.

TABLE 1

| | Component (in wt %) | | | | |
| --- | --- | --- | --- | --- | --- |
| Solders | In | Sn | Ag | Ni | Cu |
| 1 | 70 | 28.9 | 1 | 0.1 | — |
| 2 | 70 | 28.8 | 1 | — | 0.2 |
| 3 | 70 | 28.5 | 1 | — | 0.5 |
| 4 | 70 | 28.2 | 1 | — | 0.8 |

TABLE 2

| | Test | | | | | | | |
| --- | --- | --- | --- | --- | --- | --- | --- | --- |
| | Initial Pull | | | | | | High Temp. & Humidity | |
| | X | | Y | | Z | | (80° C., 95% RH, 100 h) | |
| | Ave. | σ | Ave. | σ | Ave. | σ | Ave. | σ |
| Solder 1 (Sn Plating) | 262.45 | 0.35 | 192.88 | 49.74 | 189.28 | 13.19 | 182.10 | 5.09 |
| Solder 1 (Ni Plating) | 294.17 | 4.77 | 219.95 | 0.35 | 203.18 | 19.01 | 219.88 | 3.36 |

TABLE 2-continued

| | Test | | | | | | | |
|---|---|---|---|---|---|---|---|---|
| | Initial Pull | | | | | | High Temp. & Humidity | |
| | X | | Y | | Z | | (80° C., 95% RH, 100 h) | |
| | Ave. | σ | Ave. | σ | Ave. | σ | Ave. | σ |
| Solder 2 (Sn Plating) | 276.65 | 6.15 | 156.60 | 5.73 | 190.60 | 17.49 | 191.82 | 25.70 |
| Solder 2 (Ni Plating) | 317.15 | 30.48 | 265.42 | 105.39 | 202.42 | 31.89 | 242.77 | 6.54 |
| Solder 3 (Sn Plating) | 300.75 | 6.36 | 315.05 | 119.85 | 218.36 | 21.23 | 207.03 | 15.87 |
| Solder 3 (Ni Plating) | 297.05 | 14.42 | 231.05 | 27.08 | 222.39 | 9.67 | 251.55 | 27.22 |
| Solder 4 (Sn Plating) | 288.30 | 8.91 | 221.85 | 3.75 | 193.02 | 10.97 | 190.43 | 16.51 |
| Solder 4 (Ni Plating) | 280.90 | 0.56 | 252.70 | 31.61 | 205.41 | 14.03 | 227.10 | 17.54 |

Solder 1: 70% In – 28.9% Sn – 1% Ag – 0.1% Ni
Solder 2: 70% In – 28.8% Sn – 1% Ag – 0.2% Cu
Solder 3: 70% In – 28.5% Sn – 1% Ag – 0.5% Cu
Solder 4: 70% In – 28.2% Sn – 1% Ag – 0.8% Cu

TABLE 3

| | Test Corrosion Resistance (immersing for 2 h) | | | | | | | | | | | | | |
|---|---|---|---|---|---|---|---|---|---|---|---|---|---|---|
| Solder and | 0.1N H$_2$SO$_4$ | | 0.1N NaOH | | Gasoline | | Gas Oil/Diesel Fuel | | Kerosene | | Engine Coolant | | Window washer liquid | |
| Connector | Ave. | σ | Ave. | σ | Ave. | σ | Ave. | σ | Ave. | σ | Ave. | σ | Ave. | σ |
| Solder 1 (Sn Plating) | 186.85 | 30.76 | 166.18 | 39.35 | 177.07 | 2.58 | 164.45 | 13.44 | 191.43 | 9.72 | 176.08 | 11.70 | 191.23 | 17.36 |
| Solder 1 (Ni Plating) | 191.85 | 4.45 | 180.78 | 11.28 | 193.15 | 7.57 | 201.05 | 2.12 | 210.67 | 14.81 | 170.23 | 5.13 | 193.43 | 17.22 |
| Solder 2 (Sn Plating) | 199.15 | 0.92 | 167.80 | 14.85 | 203.43 | 5.20 | 204.00 | 4.38 | 202.18 | 24.29 | 206.13 | 5.83 | 216.85 | 5.30 |
| Solder 2 (Ni Plating) | 193.30 | 5.02 | 197.13 | 16.37 | 192.30 | 6.29 | 209.32 | 11.56 | 203.73 | 7.81 | 188.88 | 2.65 | 196.83 | 47.41 |
| Solder 3 (Sn Plating) | 202.67 | 19.06 | 219.65 | 9.33 | 189.98 | 10.22 | 220.68 | 23.44 | 210.58 | 24.71 | 206.75 | 0.07 | 210.18 | 1.87 |
| Solder 3 (Ni Plating) | 206.65 | 3.32 | 226.58 | 5.27 | 238.45 | 9.62 | 199.28 | 9.30 | 205.33 | 13.12 | 202.60 | 13.22 | 217.23 | 48.05 |
| Solder 4 (Sn Plating) | 168.35 | 8.06 | 183.37 | 18.00 | 178.18 | 2.58 | 182.93 | 4.42 | 178.98 | 5.27 | 167.40 | 2.83 | 208.65 | 46.24 |
| Solder 4 (Ni Plating) | 203.98 | 19.41 | 189.15 | 14.35 | 194.35 | 5.37 | 195.85 | 8.13 | 183.80 | 6.43 | 192.35 | 3.04 | 226.53 | 5.55 |

Solder 1: 70% In – 28.9% Sn – 1% Ag – 0.1% Ni
Solder 2: 70% In – 28.8% Sn – 1% Ag – 0.2% Cu
Solder 3: 70% In – 28.5% Sn – 1% Ag – 0.5% Cu
Solder 4: 70% In – 28.2% Sn – 1% Ag – 0.8% Cu

TABLE 4

| | Salt water spray (3 cycles) | |
|---|---|---|
| Solder and Connector | Ave. | σ |
| Solder 1 (Sn Plating) | 182.37 | 17.29 |
| Solder 1 (Ni Plating) | 185.20 | 49.22 |
| Solder 2 (Sn Plating) | 188.40 | 1.06 |
| Solder 2 (Ni Plating) | 230.03 | 5.55 |
| Solder 3 (Sn Plating) | 209.95 | 27.22 |
| Solder 3 (Ni Plating) | 230.40 | 9.33 |
| Solder 4 (Sn Plating) | 196.92 | 10.29 |
| Solder 4 (Ni Plating) | 210.07 | 5.76 |

As is apparent in Tables 2, 3 and 4, use of a Ni plated connector results in significant retention of strength in the joint even after high temperature/high humidity test for 100 hours and after chemical immersion tests, in particular in alkali media.

EXAMPLE 2

In Example 2, a number of solders as described in Table 5 were used to join a connector as in Example 1 to a busbar on a glass surface. The soldered joints were subjected to tests as follows and the strength of join determined as in Example 1:

Initial pull strength in Z direction;
500 thermal cycles (−30° C. 29 min to 20° C. 1 m to 80° C. 29 min to 20° C. 1 min).
High temperature (80° C.) and high humidity (95% relative humidity) for 360 and 720 hours;
High temperature (100° C.) for 1000 hours;
Low temperature (−30° C.) for 1000 hours.

The results are reproduced for solders 5-7 with connectors with Sn plating or Ni plating in Table 6 and Table 7. Also in Tables 6 and 7 are results (Sn plating or Ni plating) for solders 1 to 4.

The use of Ni plated contacts significantly improves strength of join even after extensive testing. The results are particularly significant after high temperature testing for a prolonged period.

TABLE 5

| Solders | Component (in wt %) | | | | |
|---|---|---|---|---|---|
| | In | Sn | Ag | Ni | Cu |
| 5 | 55 | 42.5 | 2.5 | — | — |
| 6 | 65 | 32.5 | 2.5 | — | — |
| 7 | 70 | 29 | 1 | — | — |

TABLE 6

| Solder & connector | Test | | | | |
|---|---|---|---|---|---|
| | Initial Pull Z | Thermal Cycle[1] 500 cycles | High Temperature & High humidity[2] 360 hours | High Temperature 100° C. for 720 hours | Low Temperature −30° C. for 1000 hours |
| Solder 5 (Sn plating) | 155.82 | 223.63 | 134.78 | 160.83 | 204.45 | 161.33 |
| Solder 6 (Sn plating) | 168.42 | 162.45 | 102.6 | 182.75 | 136.78 | 159.67 |
| Solder 7 (Sn plating) | 145.4 | 164.15 | 136.2 | 151.5 | 103.4 | 147.78 |
| Solder 7 (Ni plating) | 226.63 | 213.05 | 242.95 | 218.13 | 219.65 | 236.95 |
| Solder 1 (Sn plating) | | 188.06 | 186.53 | 142.35 | 94.76 | 196.25 |
| Solder 1 (Ni plating) | | 204.11 | 210.57 | 219.4 | 209.75 | 204.73 |
| Solder 2 (Sn plating) | | 175.76 | 166.23 | 163.48 | 100.8 | 197.83 |
| Solder 2 (Ni plating) | | 214.71 | 211.50 | 207.6 | 199.97 | 217.3 |
| Solder 3 (Sn plating) | | 189.7 | 166.67 | 157.00 | 102.64 | 221.43 |
| Solder 3 (Ni plating) | | 203.54 | 222.25 | 203.35 | 190.5 | 230.58 |
| Solder 4 (Sn plating) | | 180.6 | 177.32 | 151.27 | 111.3 | 231.43 |
| Solder 4 (Ni plating) | | 215.1 | 190.05 | 194.60 | 192.1 | 207.8 |

[1]−30° C. 29 min to 20° C. 1 min to 80° C. 29 min to 20° C. 1 min
[2]80° C., 95% relative humidity

TABLE 7

| Solder and Connector | Test Corrosion Resistance (immersing for 2 h) | | | | | | |
|---|---|---|---|---|---|---|---|
| | 0.1N $H_2SO_4$ | 0.1N NaOH | Gasoline | Gas Oil/ Diesel Fuel | Kerosene | Engine Coolant | Window washer liquid |
| Solder 5 (Sn Plating) | 159.92 | 204.35 | 176.22 | 161.27 | 164.38 | 157.75 | 159.62 |
| Solder 6 (Sn Plating) | 182.58 | 189.13 | 167.2 | 164.7 | 171.87 | 168.5 | 190.89 |
| Solder 7 (Sn Plating) | 171.02 | 157.83 | 156.95 | 138.88 | 165.07 | 150.62 | 138.98 |
| Solder 7 (Ni Plating) | 203.42 | 182.95 | 215.78 | 223.48 | 193.78 | 236.75 | 211.80 |

The invention claimed is:

1. A vehicle glazing comprising at least one ply of glass having an electrically conductive component on at least one surface, and an electrical connector electrically connected to the electrically conductive component through a soldered joint, the solder of the joint having a composition comprising 40 to 75 wt% indium, 20 to 60 wt % Sn, 0.5 to 2 wt % Ag, 0.01 wt % or more Ni and less than 0.1 wt % Pb, wherein the electrical connector comprises a contact with nickel plating in contact with the solder.

2. The vehicle glazing as claimed in claim 1, wherein the solder has a composition comprising 0.01 wt % to 5 wt % Ni.

3. The vehicle glazing as claimed in claim 1, wherein the solder has a composition comprising 0.05 wt % to 5 wt % Ni.

4. The vehicle glazing as claimed in claim 1, wherein the solder has a composition comprising 0.08 to 0.2 wt % Ni.

5. The vehicle glazing as claimed in claim 1, wherein the solder has a composition comprising 60 to 75 wt % In.

6. The vehicle glazing as claimed in claim 1, wherein the solder has a composition comprising 0.1 to 5 wt % Cu.

7. The vehicle The glazing as claimed in claim 1, wherein the solder has a composition comprising 0.1 wt % to 2 wt % Cu.

8. A vehicle glazing comprising, at least one ply of glass having an electrically conductive component on at least one surface, and an electrical connector soldered to the electrically conductive component, characterised in that the solder has a composition comprising:
   40 to 75 wt % In,
   20 to 60 wt % Sn,
   0.5 to 2 wt % Ag, and
   0.01 to 5 wt % Ni.

9. The vehicle glazing as claimed in claim 8, wherein the electrical connector comprises a contact with nickel plating in contact with the solder.

10. The vehicle glazing as claimed in claim 8, wherein the electrically conductive component comprises electrically conductive silver-containing ink.

11. The vehicle glazing as claimed in claim 9, wherein, the solder has a composition comprising less than 0.1 wt % Pb.

12. The vehicle glazing as claimed in claim 8, wherein the solder has a composition comprising 0.06 to 5 wt % Ni.

13. A vehicle glazing comprising at least one ply of glass having an electrically conductive component on at least one surface, and an electrical connector electrically connected to the electrically conductive component through a soldered joint, the solder of the joint having a composition comprising 60 to 75 wt % indium, 20 to 60 wt % Sn, 0.5 to 2 wt % Ag and less than 0.1 wt % Pb, wherein the electrical connector comprises a contact with nickel plating in contact with the solder.

14. A vehicle glazing comprising at least one ply of glass having an electrically conductive component on at least one surface, and an electrical connector electrically connected to the electrically conductive component through a soldered joint, the solder of the joint having a composition comprising 40 to 75 wt % indium, 20 to 60 wt % Sn, 0.5 to 2 wt % Ag, 0.1 to 5 wt % Cu and less than 0.1 wt % Pb, wherein the electrical connector comprises a contact with nickel plating in contact with the solder.

* * * * *